United States Patent
Kreiner

[11] Patent Number: 5,455,210
[45] Date of Patent: Oct. 3, 1995

[54] PORCELAIN, PORCELAIN BATCH COMPOSITION AND METHOD FOR THE MANUFACTURE OF THE PORCELAIN

[75] Inventor: Roswitha Kreiner, Selb, Germany

[73] Assignee: Rosenthal Aktiengesellschaft, Germany

[21] Appl. No.: 157,634

[22] Filed: Nov. 24, 1993

[30] Foreign Application Priority Data

Nov. 30, 1992 [DE] Germany .............. 42 40 191.7

[51] Int. Cl.⁶ ................................. C04B 33/24
[52] U.S. Cl. .................. 501/32; 501/8; 501/63; 501/70; 501/72; 501/141; 501/142; 501/143; 501/144
[58] Field of Search ................... 501/141, 142, 501/143, 144, 5, 8, 14, 63, 70, 72, 123, 32

[56] References Cited

U.S. PATENT DOCUMENTS

| | | | |
|---|---|---|---|
| 2,635,058 | 4/1953 | Wooldridge | 501/144 |
| 2,776,899 | 1/1957 | Donahey | 501/144 |
| 2,898,217 | 8/1959 | Seking | 501/144 |
| 3,431,126 | 3/1969 | Fukui | 501/143 |
| 3,501,321 | 3/1970 | Margola | 501/144 |
| 3,846,098 | 11/1974 | Nakashima et al. | 501/144 |
| 3,893,841 | 7/1975 | Nijhawan et al. | 501/123 |
| 4,134,772 | 1/1979 | Ichiko et al. | 501/144 |
| 4,219,360 | 8/1980 | Thompson | 501/142 |
| 4,337,317 | 1/1982 | Beard | 501/142 |
| 4,843,047 | 6/1989 | Oda | 501/143 |

*Primary Examiner*—Mark L. Bell
*Assistant Examiner*—Michael Marcheschi
*Attorney, Agent, or Firm*—Jones & Askew

[57] ABSTRACT

The invention relates to a porcelain with a transparency and strength properties of a hard porcelain, characterized by a phosphate-containing glass phase as well as the predominance of unreacted quartz grains in the matrix. The invention relates to a porcelain batch composition as well as to a method for the manufacture of the porcelain.

13 Claims, 2 Drawing Sheets

PORCELAIN, PORCELAIN BATCH COMPOSITION AND METHOD FOR THE MANUFACTURE OF THE PORCELAIN

The invention relates to a porcelain, particularly a tableware porcelain, a porcelain batch composition and a method for the manufacture of the porcelain.

Currently three tableware porcelain types are distinguished in Germany: hard porcelain, vitreous porcelain and bone porcelain.

Hard porcelain as a rule is made from a batch composition consisting of 50% clay material, 25% feldspar and 25% quartz, which is fired at 1350°–1450° C., where the sharp fire takes place in a reducing atmosphere. In principle the clay material used is a light-burning firing kaolin. Feldspar acts as a flux and it is usually used in the form of a potassium feldspar or as a potassium-sodium feldspar.

The fired body of hard porcelain, which consists essentially of secondary mullite, quartz and glass phase, exhibits a high transparency and a high degree of whiteness. Furthermore, it is characterized by a high mechanical strength, good thermal and electrical properties and sufficient resistance to corrosion.

A decrease in the quartz portion results in an improvement in resistance to temperature changes; an increase in the quartz portion can lead to an increase in mechanical strength. If the kaolin portion is increased to the detriment of the quartz, the transparency decreases.

For the preparation of the composition for the manufacture of hard porcelain, the raw materials are finely divided and mixed with water. The shaping step is followed by drying and glazing. The glazing is applied to the raw body or to a body which has been spoiled by too high annealing temperatures at 900°–1100° C. in an oxidizing atmosphere. The hard porcelain is fired primarily with oxidation at 20°–900° C., with oxidation at 900°–1000° C., and with reduction at 1000°–1450° C. by sharp firing. During the cooling the atmosphere is neutral or oxidizing. During the firing the composition exhibits a very good preservation of shape. Deformations during firing are minimal.

The following property values are required for hard porcelain:

| | |
|---|---|
| Water uptake | 0 |
| Raw density | 2.3–2.4 g/cm³ |
| Pressure resistance irregular | 450–550 MPa |
| Impact bending resistance irregular | 23 MPa.m |
| Bending resistance irregular | 40–70 MPa |
| Average linear heat expansion coefficient (20–500° C.) | $4.5 \times 10^{-6}$ K.$^{-1}$ |
| Degree of whiteness irregular | >70% |
| Transparency with d = 1 mm | 2–10% |
| Resistance to temperature change | >165 K. |
| Primary components: | |
| glass phase | 64–65% |
| mullite | 27 ± 1% |
| quartz | 7 ± 0.5% |
| cristobalite | 2 ± 0.5% |

Vitreous porcelain differs from hard porcelain in its higher feldspar and quartz portions as well as, possibly, in that it has a certain content of fatty, white-burning clays in the batch composition, resulting in lower firing temperatures. Accordingly, the values of the properties of vitreous porcelain do not correspond to the high standard of hard porcelain. Vitreous porcelains are fired primarily with oxidation and as a result they often are the color of ivory. One advantage resulting from the lower firing temperatures is that, in comparison to hard porcelain, a broader range of colors for decorations or glazings is available.

Bone porcelains (bone china) are characterized by a high transparency, a creamy white color, a high degree of whiteness and good mechanical strength. The highly transparent body of bone porcelain is however relatively brittle. As a rule the batch composition consists of 20–45% bone ash, 20–45% cornish stone and 20–35% kaolin.

Bone ash is prepared from defatted leached bones by calcining with addition of air. It contains as essential mineral phase calcium phosphate. Cornish stone is a partially kaolinized potassium and sodium feldspar-containing stone which contains besides feldspar quartz, kaolin, mica and a small quantity of fluorspar.

The composition for the manufacture of bone porcelain is difficult to process particularly because of the low kaolin portion and it is more difficult to fire than other porcelain compositions. The firing occurs in an oxidizing atmosphere at 1200°–1300° C., and the first firing step is the glazing. The glaze is applied to the densely fired body. The firing for glazing is conducted at 1000°–1140° C. The relatively low firing temperature results in glazings which are softer and less scratch resistant than the conventional porcelain glazings. Because of the batch composition deformations occur relatively frequently during firing.

Most of the high manufacturing costs of hard porcelain are the result of the sharp fire temperatures. As a result, attempts have been made to change the batch composition so that lower fire sharp fire temperatures can be used while still guaranteeing that the values of the properties of hard porcelain are obtained. For example attempts have been made to improve the sintering properties using mineralizers which have an effect on quartz dissolution, such as ZnO and chalk (Silikattechnik 39 (1988), No. 7, pages 228–231). The known batch composition has, however, been designed especially for raw materials which occur only regionally, such as particular feldspar sands, where the sharp fire temperature is still relatively high at 1350° or 1380° C.

In other countries, porcelains are classified differently, but here too the batch compositions have been defined with narrow ranges and lead to certain properties of the products. A minor omission or change in the selected batch compositions and/or a change in the particular firing conditions as a rule results in unusable products. For this reason it is a traditional principle to change nothing or make only insignificantly small changes to the operating conditions.

Figure 1:
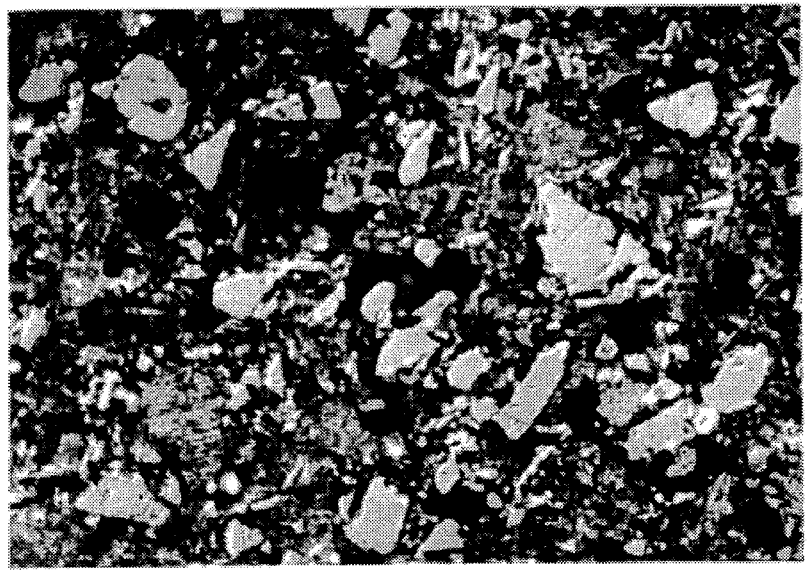
FIG. 1 is a photograph of a disclosed embodiment of porcelain made in accordance with the present invention.

The problem of the invention is to formulate a manufacturing process to produce a porcelain which has the properties of a hard porcelain but is more economical and tolerates greater variations of the firing conditions while maintaining the relatively simple manufacturing technology and the usual firing equipment.

The problem is solved by the use of a batch composition with the following chemical composition:

18–27 wt % $Al_2O_3$

50–65 wt % $SiO_2$ 0.1–0.3 wt % $Fe_2O_3$ 0.02–0.1 wt % $TiO_2$
5–8 wt % $CaO$
0.15–0.3 wt % $MgO$
0.5–2.0 wt % $Na_2O$
2.6–4.0 wt % $K_2O$
3.5–6.0 wt % $P_2O_5$.

Raw materials of high purity with a $Fe_2O_3$ and a $TiO_2$ content of less than 0.4 wt % are used for the batch composition which is made up of clay material, feldspar, quartz and bone ash.

The particle size distribution of the batch compositions is selected advantageously as follows:

| | |
|---|---|
| <40 μm | 95–100 wt % |
| <20 μm | 82–97 wt % |
| <10 μm | 67–80 wt % |
| <5 μm | 50–65 wt % |
| <2.5 μm | 36–55 wt % |
| <1 μm | 24–35 wt % |
| <0.5 μm | 15–25 wt %. |

The particle size distribution of quartz should be as follows:

| | |
|---|---|
| <40.0 μm | 88–100 wt % |
| <20.0 μm | 55–86 wt % |
| <10.0 μm | 30–55 wt % |
| <5.0 μm | 18–30 wt % |
| <2.5 μm | 8–15 wt % |
| <1.0 μm | 3–9 wt % |
| <0.5 μm | 1–6 wt %. |

Water is admixed with the batch composition so that a processable composition is formed. Objects are formed from the compositions, and then dried and fired. The firing occurs at a temperature between 1120°–1220° C. The fired product is a low-temperature-fired transparent porcelain with the mechanical properties of hard porcelain and a firing color which depends on the oven atmosphere which has been regulated. In an oxidizing atmosphere one obtains a creamy white color corresponding to bone china and in a reducing atmosphere the gray-speckled white hard porcelain. By means of appropriately regulated oven atmospheres it is possible to obtain intermediate white tints. However, the remaining properties of the low-temperature-fired porcelain in all cases correspond to those of hard porcelain.

The batch composition according to the invention permits the following advantages:

1. Low firing temperature:

This results in an economic advantage which permits a considerable energy saving and which multiplies the life span of firing adjuvants.

2. The batch composition is suited for an oxidizing or a reducing firing atmosphere.

3. The composition is suited for rapid firing (4–6 h) and normal firing (10–18 h).

4. The product exhibits a high transparency.

5. The composition presents only small deformation during firing. This results in great advantages for design and production; a broad firing spectrum can be used, and use with oxidizing or reducing atmosphere is possible. A body with low deformation during firing makes it possible to use, as with hard porcelain, the considerably less complicated glazing application onto the absorbing body.

6. The values of the physical and chemical properties of transparency, bending-rupture resistance, impact resistance, hardness, acid resistance, washing-machine resistance, suitability for microwave ovens, freedom from heavy metal content correspond to the properties of hard porcelain fired at 1400° C.

With the new batch composition an alternate product for either hard porcelain or bone china is created. The advantage of this product is that depending on the atmosphere the white color can be influenced and thus it is possible to produce appearances which have never been obtained before.

The targeted decrease in the firing temperature to 1200° C., for example, could be reached by a rational change of the composition.

The purpose here was to be able to use the manufacturing technologies which are conventionally used for hard porcelain, and not to have to use the expensive and complicated manufacturing method of bone china. An important prerequisite here is a good stability under load of the composition during firing. The new composition has a carefully determined portion of flux, quartz and plastic raw materials, to prevent a strong deformation during firing.

The matrix structure of the body of the low-temperature fired porcelain according to the invention is clearly distinguishable from that of hard porcelain and that of bone china. Besides the completely unreacted quartz, primary mullite is present which is formed from feldspar and kaolin, and there is also tricalcium phosphate and anorthite. A glass phase surrounds all of this, and it is responsible for the high transparency of the body and contains an enriched content of $P_2O_5$. As a rule the phases of hard porcelain consist of primary and secondary mullite, glass phase, and residual quartz in various ratios. The residual quartz portion, and whether there is any residual quartz at all, depends on the firing temperature and the time in the sharp fire. The conversion of primary mullite to secondary mullite is also influenced by the firing curve. The phases of bone china consist of anorthite, calcium orthophosphate and quartz, with only a few quartz particles which have not reacted completely because of their size.

The matrix of the porcelain according to the invention (FIG. 1) consists of quartz, anorthite, mullite, glass and pores.

Figure 2:
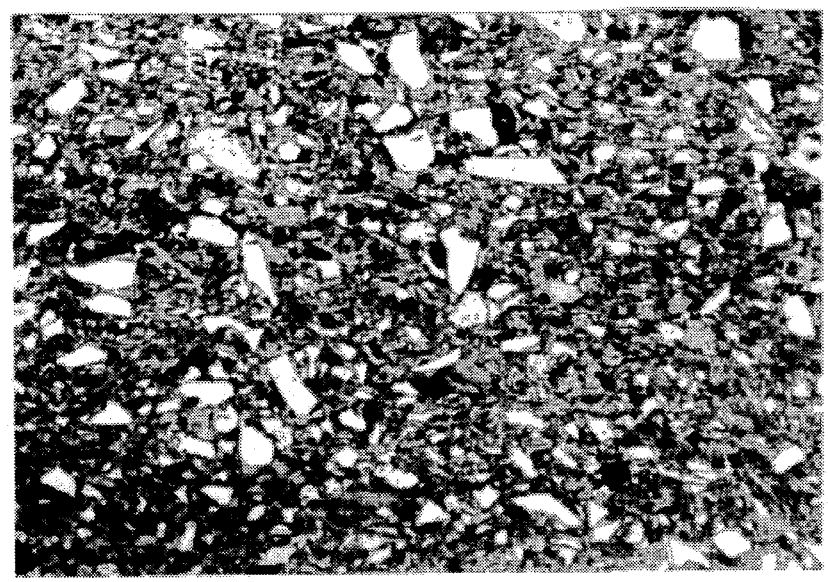
FIG. 2 is a photograph of vitreous porcelain.

The matrix of vitreous porcelain (FIG. 2) consists of quartz, mullite, glass and pores.

Figure 3:
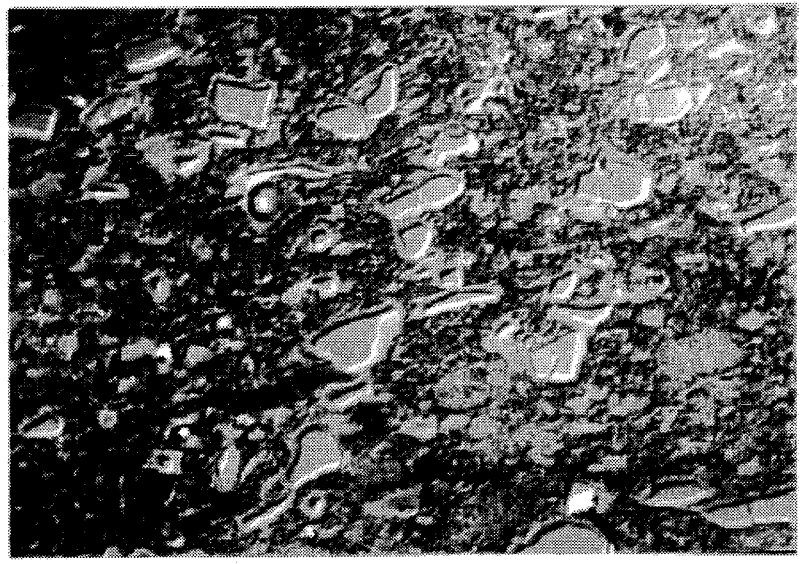
FIG. 3 is a photograph of hard porcelain.

The matrix of hard porcelain (FIG. 3) consists of residual quartz, mullite, glass and pores.

Figure 4:
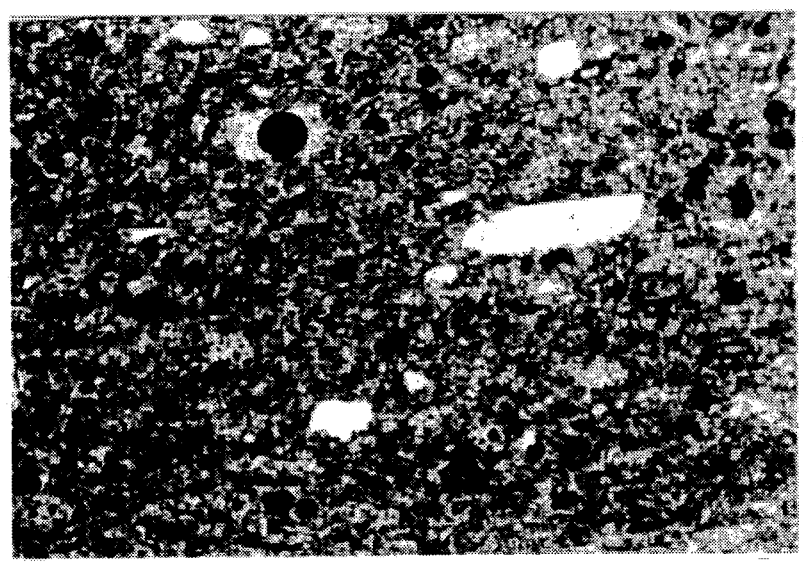
FIG. 4 is a photograph of bone china.

The matrix of bone china (FIG. 4) consists of anorthite, calcium orthophosphate and quartz, with only a few quartz particles which have not completely reacted because of their size.

It is known that as the granular fineness of the quartz and of the feldspar increases, there is an increase in vitrification and thus in transparency so that it is possible to lower the firing temperature. Furthermore it is known that the melting process can be influenced, for example, to achieve approximately the same melt phase portion in the body with rapid firing compositions as with normal firing compositions.

In comparison the invention has taken another route and surprisingly it has attained a transparency and strength levels corresponding to those of normal hard porcelain with a relatively low quartz dissolution and a relatively low melt portion.

The invention thus contains a selected batch composition which, at relatively low temperatures, can be fired either by rapid firing or by normal firing, with either oxidation or reduction. It is essential that as a function of the oven atmosphere the color of the body can be influenced, specifically with colors ranging from a creamy white in an oxidizing atmosphere to a blue-gray speckled white in a reducing atmosphere, and all intermediate colors can be produced depending on the oven atmosphere used during the firing.

The relatively low firing temperature and the possibility of selecting the atmosphere also provide the possibility to extend the glazing palette of usable glazings considerably. The composition can be colored by the addition of dissolved or pigment-like color additives and in that case the result is a colored transparent body. Furthermore, the basic composition can be covered to produce a white or colored cover with all the glazing variants conventionally used in ceramics, for example, transparent, opaque, covering, crystal separating, matt glazings.

It is surprising that in spite of the batch composition which is different compared to conventional porcelain and in spite of the resulting different matrix structure of the porcelain according to the invention a very broad firing range is available and the firing can be conducted simply and with known firing equipment, where the stability under load of the shaped body during the entire temperature treatment is optimal.

I claim:

1. A phosphate-containing low-temperature-fired porcelain with high transparency and high strength properties, the porcelain consisting essentially of mullite, glass phase, quartz grains and pores, wherein the glass phase comprises phosphate and the quartz grains in the matrix are present in the form of unreacted components.

2. Porcelain according to claim 1, wherein the phosphate content is 3.5–6.0 wt %.

3. Porcelain according to claim 1, wherein the phosphate is tricalcium phosphate.

4. Porcelain according to claim 1, wherein the porcelain further comprises anorthite.

5. Porcelain according to claim 4, wherein the mullite is predominantly primary mullite.

6. Porcelain according to claim 1, wherein the quartz grains in the porcelain comprises 18–30 wt %.

7. Porcelain according to claim 6 wherein the unreacted quartz grains have the following grain size distribution:

| <40.0 μm | 88–100 wt % |
| <20.0 μm | 55–86 wt % |
| <10.0 μm | 30–55 wt % |
| <5.0 μm | 18–30 wt % |
| <2.5 μm | 8–15 wt % |
| <1.0 μm | 3–9 wt % |
| <0.5 μm | 1–6 wt %. |

8. Porcelain according to claim 1, wherein the porcelain has a bending resistance of 80–100 $N/mm^2$.

9. Porcelain according to claim 1, wherein $Fe_2O_3$ and $TiO_2$ are present in said porcelain as impurities and wherein the sum of $Fe_2O_3$ and $TiO_2$ therein is less than 0.4 wt %.

10. A porcelain batch composition for the manufacture of phosphate-Containing low-temperature-fired porcelain with high transparency and high strength properties consisting essentially of:

18–27 wt % $Al_2O_3$

50–65 wt % $SiO_2$ 0.1–0.3 wt % $Fe_2O_3$ 0.02–0.1 wt % $TiO_2$

5–8 wt % CaO 0.15–0.3 wt % MgO 0.5–2.0 wt % $Na_2O$ 2.6–4.0 wt % $K_2O$ 3.5–6.0 wt % $P_2O_5$.

11. Porcelain batch composition according to claim 10, the batch composition comprises clay material, feldspar, quartz and bone ash.

12. Porcelain batch composition of claim 10, wherein the raw materials of the batch composition have the following particle size distribution:

| <40 μm | 95–100 wt % |
| <20 μm | 82–97 wt % |
| <10 μm | 67–80 wt % |
| <5 μm | 50–65 wt % |
| <2.5 μm | 36–55 wt % |
| <1 μm | 24–35 wt % |
| <0.5 μm | 15–25 wt %. |

13. Porcelain batch composition according to claim 11, wherein the quartz has the following grain size distribution:

| <40.0 μm | 88–100 wt % |
| <20.0 μm | 55–86 wt % |
| <10.0 μm | 30–55 wt % |
| <5.0 μm | 18–30 wt % |
| <2.5 μm | 8–15 wt % |
| <1.0 μm | 3–9 wt % |
| <0.5 μm | 1–6 wt %. |

* * * * *